Jan. 17, 1956 R. FAGAN ET AL 2,730,936
IDENTITY RECORDER
Filed Oct. 13, 1952 3 Sheets-Sheet 2
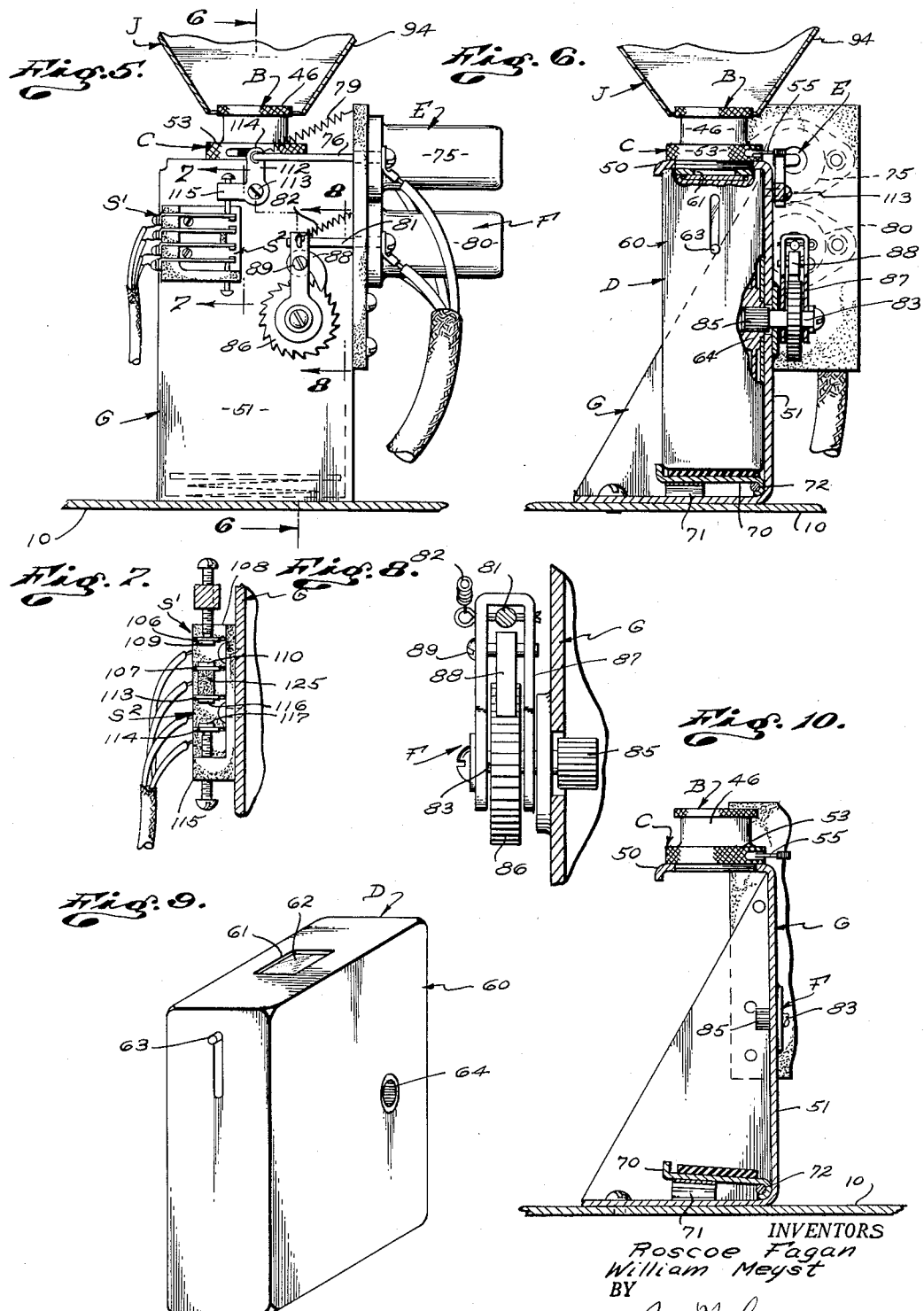
INVENTORS
Roscoe Fagan
William Meyst
BY
Attorney Jan. 17, 1956  R. FAGAN ET AL  2,730,936
IDENTITY RECORDER
Filed Oct. 13, 1952  3 Sheets-Sheet 3
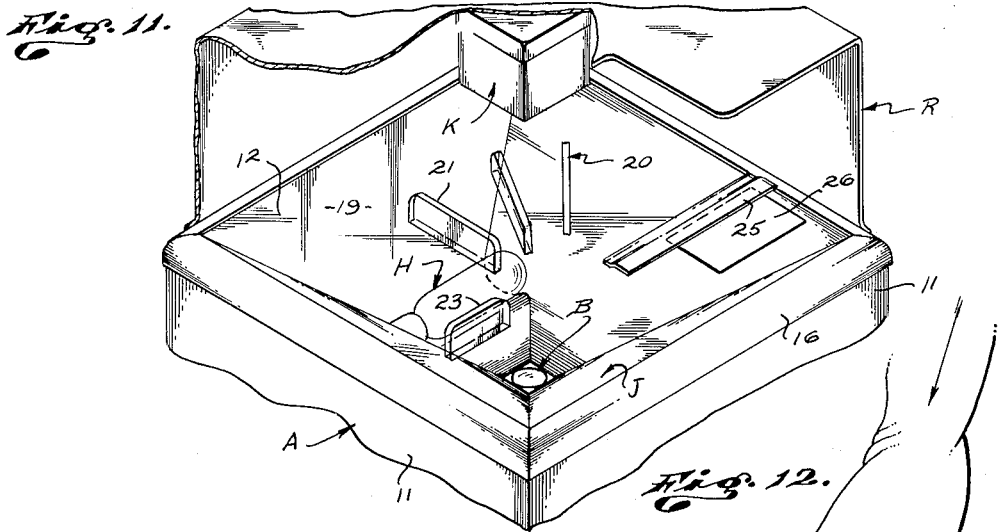
INVENTORS
Roscoe Fagan
William Meyst
BY
Attorney United States Patent Office 2,730,936
Patented Jan. 17, 1956

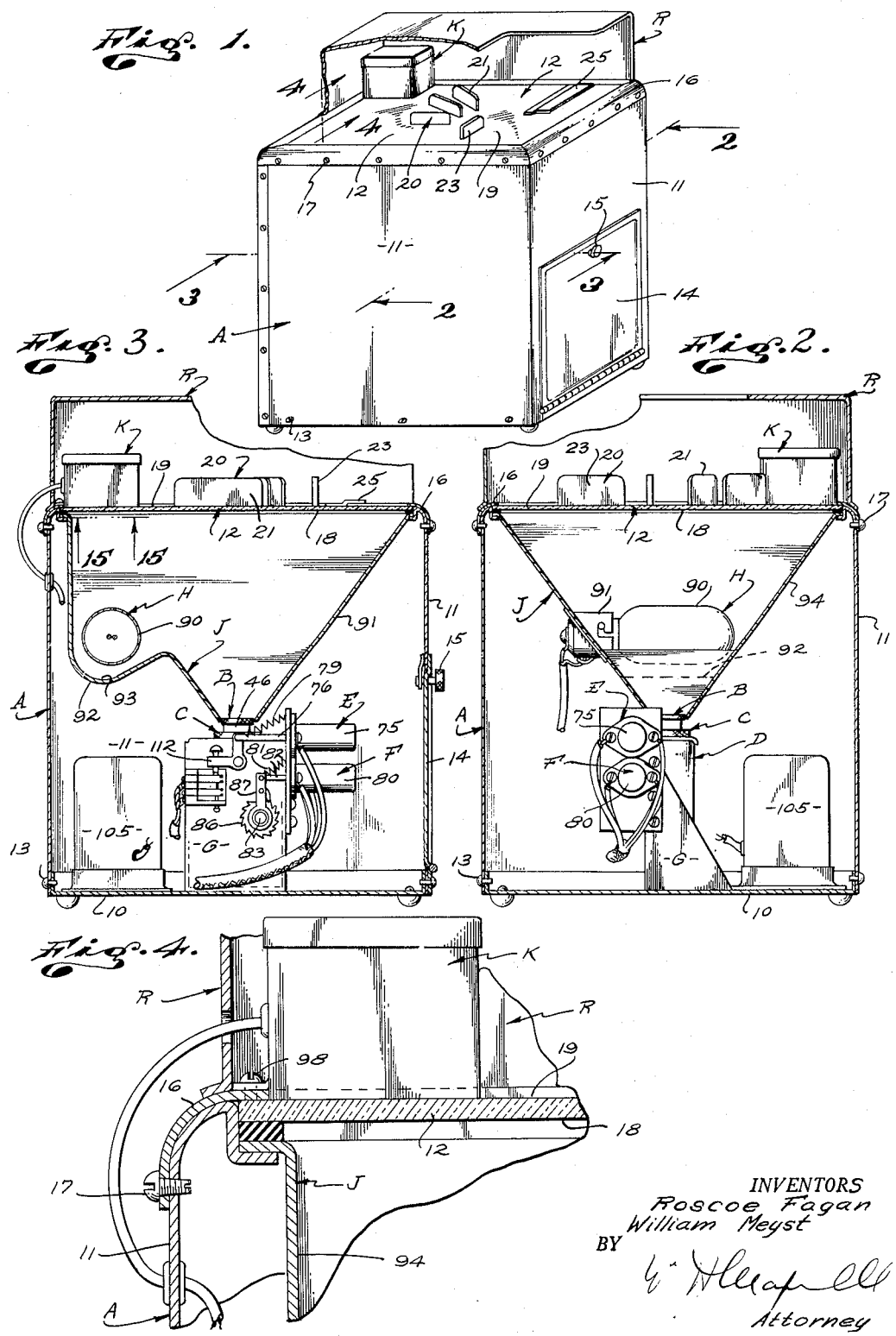

2,730,936

IDENTITY RECORDER

Roscoe Fagan and William Meyst, Bakersfield, Calif.

Application October 13, 1952, Serial No. 314,436

1 Claim. (Cl. 95—1.1)

This invention relates to an identity recorder, that is, to a device operable to record factors necessary or incidental to the identification of persons and it is a general object of the invention to provide such a device which is of simple practical construction and which is operable to dependably and effectively record material or information such, for example, as finger or hand prints, identifying records, time, etcetera.

There are various situations requiring the recording of factors incidental to the identity of persons, for example, it has long been common practice for law enforcement agencies or authorities to make records of finger prints and to coordinate with such records other factors incidental to or bearing upon identity. It is also highly desirable in the course of conducting various phases of business that persons be identified and that adequate and effective records be made concerning identity. As an example of the latter type of situation, merchants are frequently called upon to extend credit or to cash checks and it becomes highly important to establish the identity of persons involved in such transactions so that they can be effectively traced and possibly apprehended should it appear that they have misrepresented themselves or are in violation of laws or regulations.

It is a general object of this invention to provide a device for establishing the identity of persons, that is, for making records of identity and to provide such a device which is exceedingly simple in construction and in operation so that it is practical for use in the course of various activities where the establishing of identity is required or advantageous.

Another object of this invention is to provide a device of the general character referred to which makes possible accurate and permanent recording of hand or finger prints of a person without requiring or taking any appreciable amount of time of the person and without in any way inconveniencing the person.

It is another object of the invention to provide a device of the general character referred to employing elements or mechanical means requiring successive operations for the establishment of the desired records and including a control means characterized by a single manually operable control such as a switch which is the only element of the structure requiring manual operation.

It is another object of this invention to provide recording apparatus of the general character referred to effective to gain an accurate permanent record of a hand or parts thereof without requiring the application of dyes or other material to the hand or parts recorded.

The apparatus as provided by the present invention is characterized by a box-like housing, the top of which is transparent and has an area to be engaged by a person's hand or parts thereof, an area to receive a document or other evidentiary matter and carrying a time indicator. A lens of the type employed in a camera is located in the housing intermediate the top and bottom thereof and a shutter mechanism is related to the lens. A film handling means is related to the lens and is located below the lens. An operating means is provided for the shutter mechanism and an operating means is provided for the film handling means while a mounting means is provided in the housing carrying the other parts located in the housing. Illuminating means is provided in the housing and may be characterized by one or more lamps and a light-handling means is provided and may be characterized by a reflector related to the lamp and a shield cooperating with the top of the housing and the lens. The invention provides a control means, preferably an electric control characterized by a single manually operable switch accessible at the exterior of the housing and a circuit or circuits such that when the manual switch is closed the operating means for the shutter is actuated following which the lamp is energized while the shutter is open and following which action the film handling mechanism is operated and serves to advance the film after the shutter has closed, making the apparatus ready for a subsequent cycle of operation.

The various objects and features of our invention will be fully understood from the following detailed description of a typical preferred form and application of our invention, throughout which description reference is made to the accompanying drawings, in which:

Fig. 1 is a perspective view of a structure embodying the present invention showing the structure ready for use and with a hood on the structure and partially broken away. Fig. 2 is an enlarged vertical sectional view of the apparatus being a view taken substantially as indicated by line 2—2 on Fig. 1. Fig. 3 is an enlarged vertical sectional view of the apparatus being a view taken substantially as indicated by line 3—3 on Fig. 1. Fig. 4 is an enlarged detailed sectional view of a portion of the structure being a view taken substantially as indicated by line 4—4 on Fig. 1. Fig. 5 is an enlarged view of a portion of the structure shown in Fig. 2. Fig. 6 is a sectional view taken substantially as indicated by line 6—6 on Fig. 5. Fig. 7 is an enlarged detailed sectional view of a portion of the structure shown in Fig. 5, being a view taken as indicated by line 7—7 on Fig. 5. Fig. 8 is an enlarged detailed sectional view of a portion of the structure shown in Fig. 5, being a view taken as indicated by line 8—8 on Fig. 5. Fig. 9 is a perspective view of the film handling means included in the structure showing it apart from the other elements. Fig. 10 is a view similar to Fig. 6 with the film handling means removed from the other parts. Fig. 11 is an enlarged perspective view of the top or upper end portion of the housing illustrating features or elements of construction as provided by the present invention. Fig. 12 is an enlarged detailed sectional view of a portion of the top of the housing showing a person's hand applied thereto for the purpose of establishing a record thereof. Fig. 13 is a view illustrating a sample or specimen record as obtained by the apparatus of the present invention. Fig. 14 is a wiring diagram illustrating generally the control means provided by the present invention, and Fig. 15 is an enlarged view taken as indicated by line 15—15 on Fig. 2.

The structure provided by the present invention is characterized generally by a housing A, a lens means B located in the housing intermediate the top and bottom thereof, a shutter mechanism C cooperatively related with the lens means B, film-handling means D cooperatively related to the means B and C, operating means E for the shutter mechanism C, operating means F for the film handling means D, mounting means G for elements such as the elements B, C, D, E, and F required to be handled or entered in the housing A, illuminating means H adapted to illuminate the top of the housing from the lower side thereof, light-handling means J cooperatively related to the means H, the top of the housing and the lens means B, a time indicator K, a control means L preferably in the nature of an electric control system controlling and coordinating the action of the working parts such as the shutter mechanism, the film handling mechanism, the elements E and F, etc., and a hood R over the housing A.

The housing A employed in the structure may in practice vary widely in form and construction and may vary widely in size, shape and design. In the case illustrated and for purpose of example the housing A is shown as a simple box-like unit having a simple flat bottom 10, a plurality of simple flat vertically disposed side walls 11, and a horizontally disposed transparent top 12. The bottom 10 and side walls 11 of the housing are preferably formed of sheet material such as sheet metal and these various parts are normally rigidly joined or connected together. In the preferred construction the bottom is separable from the assembly of the sides 11 and is releasably joined thereto by means of releasable fasteners such as screws 13. In the particular case illustrated, one of the side walls 11 is provided with an access opening or aperture normally closed by cover plate 14 held in place by a releasable fastener 15 which may be a key-controlled device as circumstances require.

The top 12 of the housing is a significant element of the structure and a typical case is the form of a single or unitary body of transparent material such as glass. In the particular case illustrated the top 12 is held in place in the top of the housing by suitable retainer or frame 16 secured to the sides 11 by suitable fasteners 17. In the case illustrated, the top 12 has a simple flat unobstructed bottom side 18 while its top side 19 is provided with means 20 serving to guide parts of the hand in a predetermined manner, for instance, as shown in Fig. 12 to the end that the parts of the hand that are recorded by the action of the structure appear on the record as illustrated in Fig. 13.

The means 20 may in practice vary widely in form and construction, however, in a typical carrying out of the invention the means 20 includes a plurality of vertically projecting spacers 21 occurring on the top 12 and projecting upward from the top side 19 thereof to engage or occur between the fingers 22 of the hand engaged with the top 12.

Means 20 further preferably includes a guide element 23 similar to the spacers 21 in that it projects upward from the top side 19 of the top 12 but differing or varying therefrom in that it is located a substantial distance from the group of spacers 21 and is such that when the thumb 24 of the hand is engaged behind it as the fingers 22 are between the spacers 21 the thumb is effectively guided in flat bearing engagement with the upper side 19 of the top 12. In carrying out the invention the elements or parts of means 20 may be variable or as shown in the drawings may be fixed or integral projections on the top 12.

Another feature of the present invention is the provision of a document guide 25 at the upper side of the top 12 spaced from the elements and means 20 to be at a part of the top where a card or document 26 applied to the holder 25 to be held against the surface 19 of the top 12 is so spaced from the hand applied as shown in Fig. 12 to establish a record 27 spaced from the record 28 of the hand on the permanent recording 30 established by operation of the structure. In the particular case illustrated the holder is shown as a simple flat flange-like part secured to the top 12 to have a portion spaced above the top to define a channel suitable for holding an identifying card or the like as shown in Fig. 11 of the drawings. In carrying out the invention the card 26 may be a document or a record such for example as a check, a driver's license, a business card, a card evidencing discharge from military service, or any other document or card that is available or desired. It is to be understood that in practice in carrying out the invention the holder or holders as applied to the top 12 may serve to hold a plurality of documents such as the ones above mentioned to the end that a plurality of documents are recorded as the record is made.

The time indicator K which is employed in a preferred form of the invention may in practice be any suitable form or type of indicating device such for example as an electrically powered or continuously driven mechanism having a plurality of indicators serving to continuously indicate time such as the date and the time of day. In the particular case illustrated, the indicator K may be considered as any suitable mechanism having for example a hand indicating the month, a hand indicating the day, and hands indicating the time of day as shown in Fig. 15. In the record 30 there is disclosed a typical record as made by the indicating means K and there it is an image of a record or hand 41 indicating the day and the image or record of hands 42 indicating the time of day. Time indicating devices K per se are well-known mechanisms varying widely in form and construction and it is therefore to be understood that in carrying out the present invention any suitable indicating mechanism may be employed as circumstances may require.

The typical time indicator K illustrated in the drawings is an electrically actuated unit and it is shown connected by lines 43 with the main power lines 44 and 45, at a point ahead of the control switch of the control means L.

In practice the structure may include or be provided with a hood or shield R carried by the housing A to overlie or enclose the top 12 of the housing. In the drawings the hood is shown as a simple shell-like element carried on the housing and open at one side to enable a hand to be entered under it to engage the top of the housing.

The lens means B provided by the present invention may in practice be any suitable lens mechanism such as is employed in a camera and in the drawings the means B is shown as including a suitable tubular case 46 in which the lens or lenses not shown are carried. In the case illustrated the lens means B is combined with or cooperatively related to shutter mechanism C, the parts being combined so that the mechanism C is joined to the lower end of the case 46 and the combined lens means B and shutter mechanism C are supported by an element 50 of the mounting means G.

The element 50 of the means G is a horizontally disposed part at the upper end of a vertically disposed standard 51 projecting up from the bottom 10 of the housing A. The element 50 supports the combined lens means and shutter mechanism so that this assembly or unit is intermediate the top and bottom of the housing and is centrally located in the housing with the axis of the lens means vertically disposed.

The shutter mechanism which is combined with the lens means B may in practice be any suitable light trap or shutter device and in the case illustrated this mechanism is shown as including a case 53 connected to the case 46 of the means B while an operating lever or arm 55 projects from the side of the case 53 and is adapted to be operated or moved horizontally to effect actuation of the mechanism C. In a typical carrying out of the invention the structure may be such that if the operating lever 55 is moving horizontally in one direction from an unactuated position it trips the mechanism so that light is passed therethrough, for a limited and predetermined length of time.

The film-handling means D is preferably of the type commonly referred to as a film magazine and may in practice be a means including a simple case 60 and having a wall with a light opening 61 adapted to pass light into the case. The means D may include a closure 62 normally stopping light from entering the case 60. The closure is under control of a safety member 63 adapted to be actuated or pressed so that the opening 61 is open when the magazine or means D is in operating position in the structure.

In carrying out the invention it is preferred that the means D be a unit adapted to handle or carry an elongate strip of film and it may in practice include spaced spools carrying the film, for example, a feed spool and a take-up spool, and it may include a spool-handling mechanism including an operating part 64 accessible from the exterior of the case. In carrying out the present invention, any suitable film-handling means or magazine may be employed and since the invention is not concerned with the details of such device, such details are omitted from the drawings and are merely indicated in a general way in the diagram Fig. 14, where a film feed spool 65 is shown carrying film 66 which passes to a take-up spool 67. It is to be understood of course that such elements are in practice incorporated in the case 60 illustrated in Fig. 9 of the drawings.

The case 60 housing the elements of means D is adapted to be supported by the mounting means G so that the case 60 is held stationary with the aperture 61 aligned with and preferably immediately below the shutter mechanism C. In the case illustrated the top of case C is arranged to abut or engage beneath the element 50 of means G and the means G includes a pressure plate 70 operated by a spring 71 carried by a pivot pin 72 so that it normally yieldingly bears up against the bottom of the case 60 to hold the case tight against the element 50.

Through the construction just described the means D or the film-carrying mechanism is detachable or separable from the other parts and when the closure 14 of housing A is removed the magazine of means D can be arranged in place and removed and replaced as circumstances require. It is to be understood that in practice a film of substantial length can be carried by the means D so that a very substantial number of records can be applied thereto without requiring change or replacement of the means D.

The operating means E provided for controlling or operating the shutter mechanism C is shown carried by the mounting means G and in the preferred form of the invention it is an electromagnetic means. In practice the means E may include any sort of suitable electromagnetic unit, for instance, it may be a structure including a coil or winding 75 and a core 76 cooperatively related to the winding and the structure may include a spring 79 or other means whereby the core is normally in a retracted position relative to the winding. The construction is such that when the winding is energized the core 76 is moved outwardly or away from the winding.

In the form of the invention illustrated the shiftable or movable core 76 of means E is cooperatively related to the operating lever or arm 55 of mechanism C so that when the core is operated or moved away from the winding it pushes and operates member 55. The manner in which these parts are cooperatively related is clearly illustrated in Figs. 5 and 6 of the drawings.

The operating means F provided for operating the film-handling means D is shown carried by the mounting means G and it is preferably an electromagnetic unit. In the particular case illustrated, the means F is shown as including a coil or winding 80 and a core 81 cooperatively related to the winding, the unit may include a spring 82 or other means normally yieldingly holding the core retracted.

The particular means F illustrated in the drawings includes a ratchet mechanism cooperatively engaged with means D and adapted to be actuated by the electromagnetic unit including a winding 80 and core 81. The ratchet mechanism illustrated in the drawings includes a shaft 83 rotatably carried by the mounting means G.

A releasable coupling is provided for connecting shaft 83 with the element or part 64 of means D. In the case illustrated the coupling includes a splined head 85 on the shaft 83 adapted to cooperatively engage a complementary portion of member 64. A ratchet wheel 86 is carried on the shaft 83 and a rocker arm 87 pivoted on shaft 83 carries a pawl 88 cooperating with the ratchet wheel. The pawl is pivotally carried by a pivot pin 89 mounted on the arm 87.

With the construction just described, when the coil 80 of means F is energized the core 81 is operated from its normal position and when the coil is released the spring 82 returns the core to its normal position and the course of that operation turns the shaft 83 a predetermined amount through the ratchet mechanism coupling core 81 and the shaft 83. As a result of this, each time the core 81 is energized and following its release the film-handling means D is operated a predetermined amount, for example, a distance corresponding to a length of film required for one record such as is shown in Fig. 13.

The illuminating means H is located in the housing A and may in practice include one or more suitable lamps. In the case shown there is a lamp 90 carried in a socket 91 suitably mounted in the housing laterally offset from the vertical axis of the lens means B and at a point located a suitable distance below the top 12.

The light-handling means J preferably included in the structure is shown as including a reflector 92 having a concave side 93 suitably spaced from and related to the lamp 90 so that it reflects light from the lamp that would otherwise fail to reach the top 12 upwardly and to the top 12. The light from the lamp and the reflector serves to effectively illuminate the top 12 of the housing when the lamp 90 is energized.

The means J further includes a shield construction or shields 94 in the housing serving generally to shield between the margins or edge portions of the top 12 of the housing and the lens means B so that light from the top 12 is effectively passed to the lens means B, that is, fixed from entering the lower portion of the housing where the various elements of the structure such as the shutter C, means D, E, F, etc., are located.

The particular time indicator K hereinabove referred to and shown mounted on the top 12 of housing A may in practice be suitably secured or fixed in position as by means of fasteners 98 securing the means K to the frame 16 of the housing that holds the top 12.

The control means L provided by the present invention is an electrical means illustrated generally in the diagram Fig. 14 and in practice it is preferably energized from the power lines 40 and 45. In the particular form of the invention illustrated the control means L includes a main or primary switch S which is a primary control element preferably a manually operable switch located externally on the exterior of the housing A, either on the exterior of the housing or at a point remote from the housing as circumstances may require. The switch S controls a circuit energized from lines 44 and 45 and carried by lines 100 and 101 to which the winding 75 of means E is connected. As a result of this, when switch S is closed the winding 75 of means E is energized.

The control means L includes, further a second switch $S^1$ located in the housing A and controlling the circuit to lamp 90 and a third switch $S^2$ controlling a circuit to the coil 80 by means F.

The circuit from switch $S^1$ to the lamp 90 is carried by lines 103 and 104 and in the particular case illustrated a flash power pack or suitable capacitor 105 is connected in the circuit to the lamp 90 so that when switch $S^1$ is closed the lamp 90 is suddenly and intensely energized.

The switch $S^1$ in the case illustrated is shown as involving two spring arms 106 and 107 carried by mounting 108 so that they are electrically insulated. Contacts 109 and 110 carried by the arms 106 and 107 respectively are normally spaced apart so that the switch $S^1$ is open.

In accordance with the present invention, a suitable operating connection is provided between the means B and the switch $S^1$. In the particular case illustrated this connection is shown as including a bell crank 112 having a pivotal mounting 113. The bell crank 112 has one arm 114 connected to the core 76 to be operated thereby. In the particular case illustrated the construction is such that the arm 114 is interposed between the core 76 and the operating member 55 of mechanism C as shown throughout the drawings. Arm 115 of the bell crank 112 is adapted to engage and operate the spring arm 106 of switch $S^1$ and the parts are arranged and related so that when the core 76 is operated by energization of the winding 75 the arm 106 of the switch $S^1$ is depressed or operated with consequent movement of contact 109 and the engagement with contact 110 so that switch $S^1$ is closed.

In practice the parts are related so that the parts thus far described act when the winding 75 is energized so that the shutter mechanism C is opened and while it is open the lamp 90 is energized. It is to be understood that the shutter mechanism C may be set, regulated or constructed so that it opens only for a predetermined length of time and in practice the energization of the lamp 90 may be such that it is so related or coordinated with the opening of mechanism C that a predetermined amount of light is passed by the lens B to the film carried by means D so that a suitable record is established of a hand or other parts present at top 12 of the housing.

The circuit to the coil 80 by means F is carried by lines 120 and 121 and is under control of the switch $S^2$.

The switch $S^2$ is shown as including a spring arm 113 and a spring arm 114 which arms are carried by a suitable mounting 115' so that they are electrically insulated from each other. Contacts 116 and 117 are carried by the arms 113 and 114 respectively and are normally spaced apart.

In accordance with the invention the switches $S^1$ and $S^2$ are related so that they operate one from the other, that is, so that switch $S^2$ is operated from switch $S^1$ and closes following closing of switch $S^1$. In the case illustrated an operating member 125 is shown connecting the arm 107 of switch $S^1$ with the arm 113 of switch $S^2$ and through this construction, when the bell crank 112 is operated by the core 76 of means E it first depresses arm 106, closing switch $S^1$, and then causes deflection of arm 107 so that the arm 113 of switch $S^2$ connected thereto is operated, causing contacts 116 and 117 to engage so that switch $S^2$ is closed.

When the switch $S^2$ is closed the circuit to the winding 80 is energized and the means is operated with consequent operation of the film-handling means D. Through the construction provided by the invention the energization of coil 80 follows operation of the shutter mechanism C and the lamp 90 so that the means D is operated following exposure of the film and serves to make the construction ready for a subsequent operation.

With the control means L provided by the present invention, simple operation or closing of switch S results in operation of the mechanism through a complete cycle and the parts that operate operate in the desired sequence and in the desired manner, so that each time the switch S is closed an exposure or recording is made upon film means D. In employing the structure provided by the present invention, say, for example as it is used to establish identity of a person seeking credit, the hand of the person is applied to the top 12 of housing A as shown in Fig. 12 of the drawings, so that the fingers 22 are suitably spaced and located while the thumb 24 is positioned to press or bear squarely upon the top 12.

Any suitable documentary material such as an identification card, a check, or other such object may be located on the top 12 to be held by the holder 25 and the time indicating means K is of course in constant operation. With the hand engaged with the top of the housing, the switch S is closed, whereupon the structure completes a cycle of operation and does so very rapidly, in fact almost instantaneously. Immediately upon completion of one operation the device is ready for the next or subsequent operation, and it will be immediately apparent that the device can be maintained in operation over an extended period of time.

In a typical handling of the device, the magazine or means D can from time to time, say, for instance at certain selected intervals, be removed, and replaced by an un-used unit, and it can be stored subject to use should it be necessary to refer to a record, or it can be reduced to one or more final records and these can be stored or classified or distributed as circumstances may require.

It is highly significant to note that as shown in Fig. 13 of the drawings, each recording as provided by the structure is an accurate image or print of a person's hand including not only the fingers but giving the general shape, size and contour of the hand. The record also bears an accurate image of any document or documents present as the hand was applied to the top of the housing and there is an accurate recording of the time of the operation as indicated by the means K.

Having described only a typical preferred form and application of our invention, we do not wish to be limited or restricted to the specific details herein set forth, but wish to reserve to ourselves any variations or modifications that may appear to those skilled in the art and fall within the scope of the following claim.

Having described our invention, we claim:

A structure of the character described including, a housing having a transparent top adapted to receive a hand and having finger-guiding elements at the upper side thereof, a vertically disposed lens in the housing spaced below the top, a shutter mechanism cooperatively related to the lens, illuminating means in the housing and adapted to illuminate the top from the lower side thereof, film-handling means in the housing below the lens and adapted to carry film for exposure to light from the lens, and control means cooperatively relating the operation of the shutter mechanism and the film-handling means whereby the film is intermittently advanced and exposed to light from the top, establishing records of the fingers and thumb of the hand on the top, the finger-guiding elements including, spaced guide elements projecting from the upper side of the top and adapted to occur between and space the fingers of a hand, and a guide element projecting up from the top and spaced from the said guide elements and adapted to locate the thumb of a hand in a predetermined position relative to the fingers when the fingers are guided by said elements.

References Cited in the file of this patent

UNITED STATES PATENTS

| | | |
|---|---|---|
| 1,808,118 | Peterson | June 2, 1931 |
| 1,974,174 | Chamberlain | Sept. 18, 1934 |
| 2,394,225 | Ashford | Feb. 5, 1946 |
| 2,530,758 | Cirone | Nov. 21, 1950 |
| 2,579,961 | Popma | Dec. 25, 1951 |
| 2,650,518 | Zaroff | Sept. 1, 1953 |